(12) United States Patent
Pandya et al.

(10) Patent No.: US 11,995,524 B2
(45) Date of Patent: May 28, 2024

(54) SYSTEM AND METHOD FOR PROVIDING AUTOMATIC GUIDANCE IN DATA FLOW JOURNEYS

(71) Applicant: Accenture Global Solutions Limited, Dublin (IE)

(72) Inventors: Jigar Ramanlal Pandya, Pune (IN); Devang Shantilal Shah, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 442 days.

(21) Appl. No.: 17/356,854

(22) Filed: Jun. 24, 2021

(65) Prior Publication Data
US 2022/0414527 A1    Dec. 29, 2022

(51) Int. Cl.
*G06N 20/00*    (2019.01)
*G06F 9/48*    (2006.01)

(52) U.S. Cl.
CPC ........... *G06N 20/00* (2019.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 8,595,685 B2* | 11/2013 | Sharma | ............... | G06F 11/3616 |
| | | | | 717/101 |
| 9,092,801 B2* | 7/2015 | Chang | ...................... | G06N 5/02 |
| 11,023,442 B2* | 6/2021 | Pandya | ............... | G06F 11/3476 |
| 11,113,459 B1* | 9/2021 | Olsson | .................... | G06N 20/00 |
| 11,295,375 B1* | 4/2022 | Chitrapura | ............. | G06Q 50/01 |
| 11,538,556 B2* | 12/2022 | Rothberg | ............... | G06N 3/047 |
| 2019/0188013 A1 | 6/2019 | Krishna et al. | | |
| 2019/0303107 A1* | 10/2019 | Kelly | ...................... | G06F 9/453 |
| 2020/0410392 A1* | 12/2020 | Verma | .................... | G06N 3/044 |

* cited by examiner

*Primary Examiner* — Van H Nguyen
(74) *Attorney, Agent, or Firm* — Plumsea Law Group, LLC

(57) ABSTRACT

A system and method of offering task-specific guidance to users of software. The system and method can intelligently determine which task the user is likely performing and what sequence of steps (data journey) will offer the user the most efficient route in completing the task. In some embodiments, the proposed system collects data representing in-app behavior for a large group of users in order to train a model that will predict what the user's next actions are likely to be. Furthermore, in some cases, current data for a user may include screen captures or other image data that can be compared with stored image data in order to help identify the user's current task.

17 Claims, 10 Drawing Sheets

SYSTEM AND METHOD FOR PROVIDING AUTOMATIC GUIDANCE IN DATA FLOW JOURNEYS

TECHNICAL FIELD

The present disclosure generally relates to the automation of guidance offered to users engaging in data flow journeys. More specifically, the present disclosure generally relates to a system and method for intelligently predicting a sequence of steps needed to successfully complete a particular data flow journey and then automatically presenting this sequence to the end-user.

BACKGROUND

There is a heavy dependency on training and coaching of resources for businesses (e.g., data flow journeys in Internet Technology (IT) stacks). Every point along a resource journey through a software application typically requires some level of guidance. In some cases, the environment can be dependent on senior resources for guidance, or coaching from subject matter advisors. In addition, in cases where employees are working remotely, the training of persons who are users of the organization's IT resources is an especially challenging task. At this time, there is no tool available to capture the behavior of a resource and guide (e.g., predict the next step) them. Unfortunately, this has a great impact on the quality industry in terms of time, effort, quality, and cost. Indeed, the challenge is even greater when there is a dichotomy of elements at play such as documents, data flows, and other factors that result in variations that can change the sequence of steps for performing a task correctly during a resource journey.

There is a need in the art for a system and method that addresses the shortcomings discussed above.

SUMMARY

A system and method for automated resource guidance for an information technology landscape is disclosed. The system and method solve the problems discussed above by providing a comprehensive, unified system of intelligence which can quickly learn behaviors for a resource based on real environment data. The system incorporates a process of reinforcement learning that can capture behavior, as well as a computer vision, Natural Language Processing (NLP), and distributed or asynchronous architecture that learns to automatically generate the most efficient approach and/or knowledge needed in order to achieve an end-user's goals and then offer this assistance directly to the user. In some embodiments, user data can be regularly obtained in order to serve as updated training data, thereby better ensuring the output of the prediction engine is accurate and aligned with the current resource processes. Furthermore, the accuracy of the system is improved by the use of computer vision-based image comparisons, where image data is converted to grayscale and phase differences of pixels are analyzed to determine how similar one image is to another. In addition, image comparisons for prediction of a user's current in-app task are improved by the phase information obtained for each pixel. In some embodiments, the system is configured to recommend alternate task paths through the app for the selected journey in cases where the system detects that the standard path is blocked or otherwise unavailable. In cases where there are no alternative paths, the system can notify the user before they invest effort in a task that cannot be completed at the time.

In one aspect, the disclosure provides a computer implemented method of offering predictive and automated guidance to a user of software. The method includes a first step of automatically collecting user activity data related to performing a first in-app task from a plurality of computing devices, where each computing device of the plurality is running the software over a period of time that occurs prior to a first time. A second step includes training a deep learning model configured to identify the first in-app task using the collected user activity data, and a third step includes receiving, from a first user computing device, first data representing in-app behavior for a first user at a first time. In addition, the method includes a fourth step of determining, via the deep learning model, that the first data corresponds to a high likelihood of the first user engaging in a first step of the first in-app task, and a fifth step of automatically identifying, via the deep learning model, a first sequence of in-app steps that can be used to perform the first in-app task based on the collected user activity data. Furthermore, the method includes a sixth step of presenting, via the first user computing device, a first assistance message providing guidance about the first in-app task including information about a second step that is directly subsequent to the first step in the sequence.

In another aspect, the disclosure provides a non-transitory computer-readable medium storing software comprising instructions executable by one or more computers which, upon such execution, cause the one or more computers to: (1) automatically collect user activity data related to performing a first in-app task from a plurality of computing devices each running the software over a period of time that occurs prior to a first time; (2) train a deep learning model configured to identify the first in-app task using the collected user activity data; (3) receive, from a first user device, first data representing in-app behavior for a first user at a first time; (4) determine, via the deep learning model, that the first data corresponds to a high likelihood of the first user engaging in a first step of the first in-app task; (5) automatically identify, via the deep learning model, a first sequence of in-app steps that can be used to perform the first in-app task based on the collected user activity data; and (6) present, via the first user device, a first assistance message providing guidance about the first in-app task including information about a second step that is directly subsequent to the first step in the sequence.

In yet another aspect, the disclosure provides a system for offering predictive and automated guidance to a user of software, the system comprising one or more computers and one or more storage devices storing instructions that may be operable, when executed by the one or more computers, to cause the one or more computers to: (1) automatically collect user activity data related to performing a first in-app task from a plurality of computing devices each running the software over a period of time that occurs prior to a first time; (2) train a deep learning model configured to identify the first in-app task using the collected user activity data; (3) receive, from a first user device, first data representing in-app behavior for a first user at a first time; (4) determine, via the deep learning model, that the first data corresponds to a high likelihood of the first user engaging in a first step of the first in-app task; (5) automatically identify, via the deep learning model, a first sequence of in-app steps that can be used to perform the first in-app task based on the collected user activity data; and (6) present, via the first user device, a first assistance message providing guidance about the first in-app task including information about a second step that is directly subsequent to the first step in the sequence.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1A:
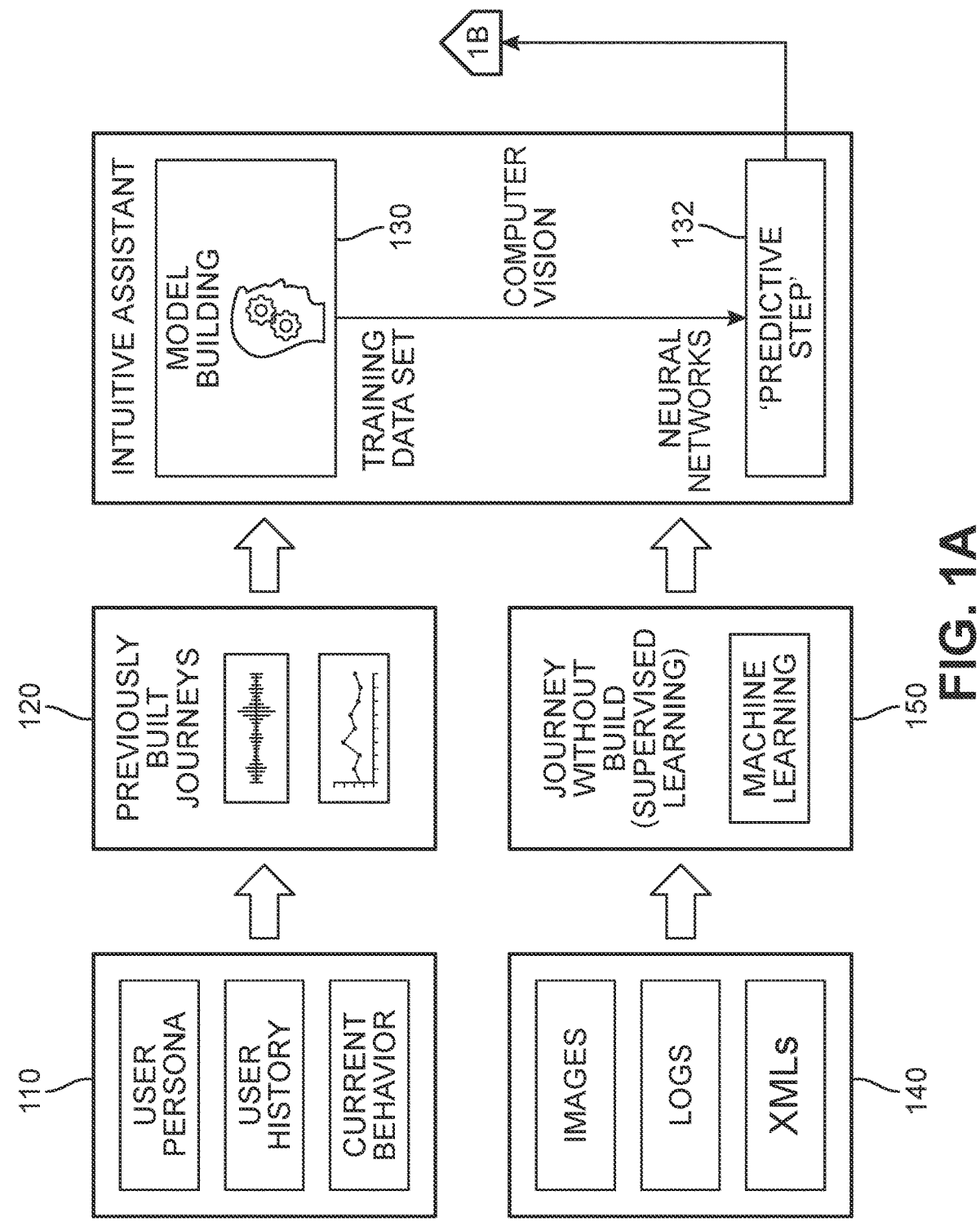
FIGS. 1A and 1B are schematic diagrams of an embodiment of a predictive assistive service system.

Businesses face challenges in obtaining knowledge with a contextual understanding of the entire landscape (i.e., IT data flow) for every user-resource joining an organization or other project. Some users, particularly those new to the platform, may have trouble interacting with the interface as they face multiple options and features. For example, a user may wish to perform a particular task via the platform. As they begin the task, the inexperienced user will likely devote far more time in understanding and completing each step than a more proficient user would. It may require several interaction events with the task process in order for a user to be able to skillfully complete the task, and during that time mistakes may be made that can cause harm to the enterprise. In addition, a user who has not performed the same task for an extended period of time may be out of practice and require assistance or additional time. Thus, there remains a huge dependency on SMEs (Subject Matter Experts) to train those who are inexperienced or otherwise unskilled in a particular IT process. These training sessions can be time-consuming and complex, for example, based on the complexities of the software and processes, the experience of the user and SME, the number of variations possible for the specific dataflow journey, and/or the number of steps needed to complete a task. In addition, knowledge capture is often limited to document-based resources, and the performance of the stack is difficult to monitor manually.

The proposed systems and methods describe an intelligent interactive virtual guide for assisting users of a software platform. The guide is configured to automatically harvest and process data logs generated by users of the platform in order to determine the optimal sequence of steps that should be taken to perform the task. As will be discussed in detail below, the proposed paradigm relies on behavior-based learning and reinforcement learning techniques that address all the challenges listed above. In addition, this automated assistance service, which may also be referred to as a behavior-based intuitive reinforcement learning assistant, is configured to absorb the features and processes of the operational landscape of an IT Stack or platform by collecting data describing the steps taken during various end-to-end data flow journeys, such as screen capture image data and metadata for skilled users of the platform.

In different embodiments, the assistance service can further create and maintain a digital process knowledge repository for the various paths without manual intervention. The model generated for each path can be continuously updated as new user data is collected, providing a self-learning service. Thus, the service can provide step-by-step guidance to a platform user that can help prevent situations in which the system may be impacted by a single point of failure at a process junction caused by an inexperienced user. In addition, in some embodiments, the service is configured to reroute users to the next most optimal path if a particular path for performing a task is undergoing delays or other impediments. For example, if a journey is blocked, the user is alerted to avoid that particular journey for the time being. The service can further conduct assessments of its models for each path based on collected analytics for the platform for each data journey.

The proposed embodiments can thereby offer an intelligent approach for guiding new users, as well as testers or quality engineers, application support groups, call centers, etc., that is based on individual (in-app) behavior, allowing the user to correctly complete the task from their initial engagement with the platform without dependence on the availability of SMEs. In other words, a new user can select a particular journey and be presented with a step-by-step model on their display screen. In one example, the system and method enable the platform to offer guidance regarding the most efficient path for completing a platform-based task by referring to the approach that has been taken by previous experienced users to complete the same task. In different embodiments, the service can recommend the next predicted step graphically, or the entire sequence of steps. In addition, the service can be configured to recommend which set of test data should be used by a test engineer, and maintain a digital repository of all of the models.

Figure 1B:
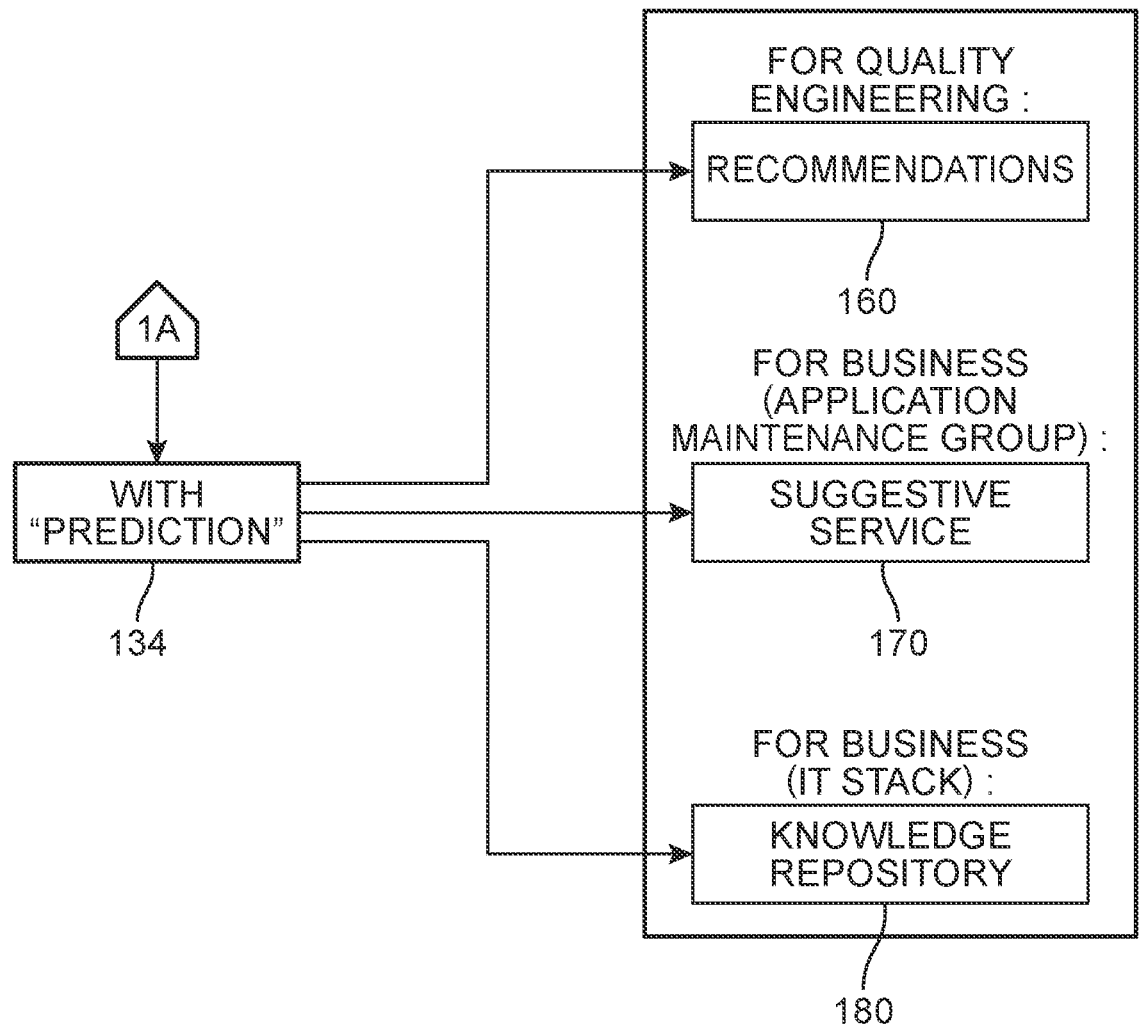

For purposes of introduction, FIGS. 1A and 1B provide an overview of some embodiments of the systems and methods disclosed herein. In FIG. 1A, in a first stage, individual end-user characteristics 110 are collected, including their persona, history, and current behavior. In this case, a user's persona type refers to their role and/or access level with respect to the platform, such as but not limited to a tester, business consultant, product retailer, call center agent, customer service representative, etc. Furthermore, in some embodiments, persona may also indicate where the user is located, as the user's site or region may affect the model that may be required (e.g., a journey for a specific product can differ from country to country). In addition, user history refers broadly to the actions and selections made by the user while accessing their computing device and/or the software application ("app") platform. This can include discrete steps such as signing into an email system, opening an inbox, drafting an email, reviewing the sent folder, etc. This information will be used by the service to link the particular series of actions and behaviors engaged in by that user to the type of role they play, in order to more accurately predict the next step(s) that should be taken. Furthermore, a user's current behavior (while using the software platform, or "in-app behavior") allows the service to predict the user's present needs and model requirements.

Thus, end-user characteristics 110 can be used to capture the steps being taken by day-to-day users in accomplishing their tasks, here identified as previously built journeys 120, which is inputted into an intuitive assistant (I.A.) model builder 130, for example as training data. In addition, during a substantially parallel process, the service harvests digital data 140 from the platform users, including but not limited to images or screenshots, logs, and XMLs. This data 140 is provided to machine learning algorithm (MLA) that is configured to generate model journeys via supervised learning techniques (i.e., without previously built journeys). The output of the MLA and the training data are processed using computer vision techniques and a neural network that is configured to generate the predictive steps or model that is most likely to serve the user's current needs or will most likely enable efficient performance of the selected task. In different embodiments, the generated models can be implemented for use in a variety of scenarios. In FIG. 1B, some examples that may benefit from predicted models 134 are shown, including recommendations for quality engineering teams 160, offering suggested services for business application maintenance groups 170, and knowledge repository for business IT stacks 180.

Figure 2:
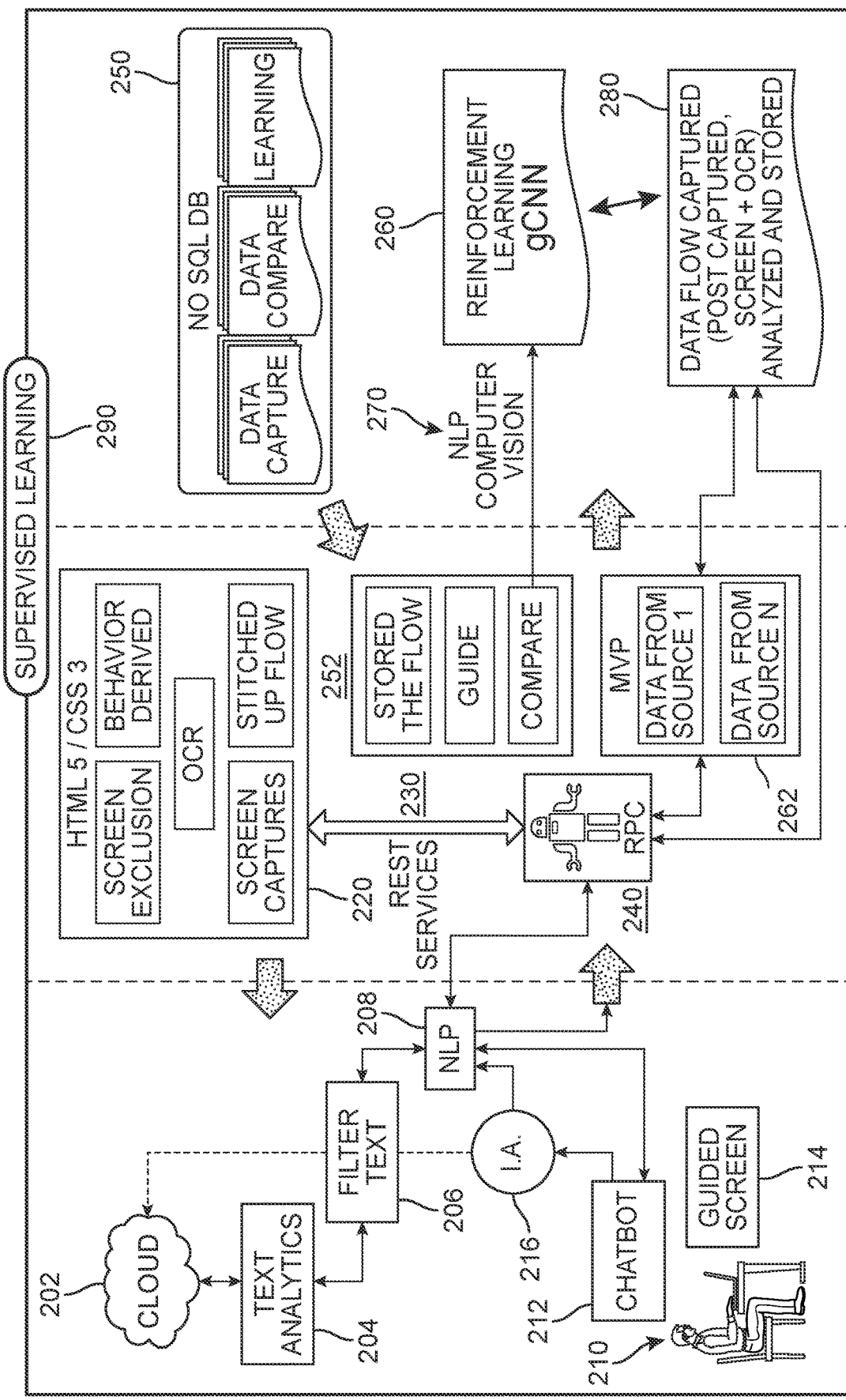
FIGS. 2 and 3 are schematic diagrams of an embodiment of an architecture of a predictive assistive service system.
Figure 3:
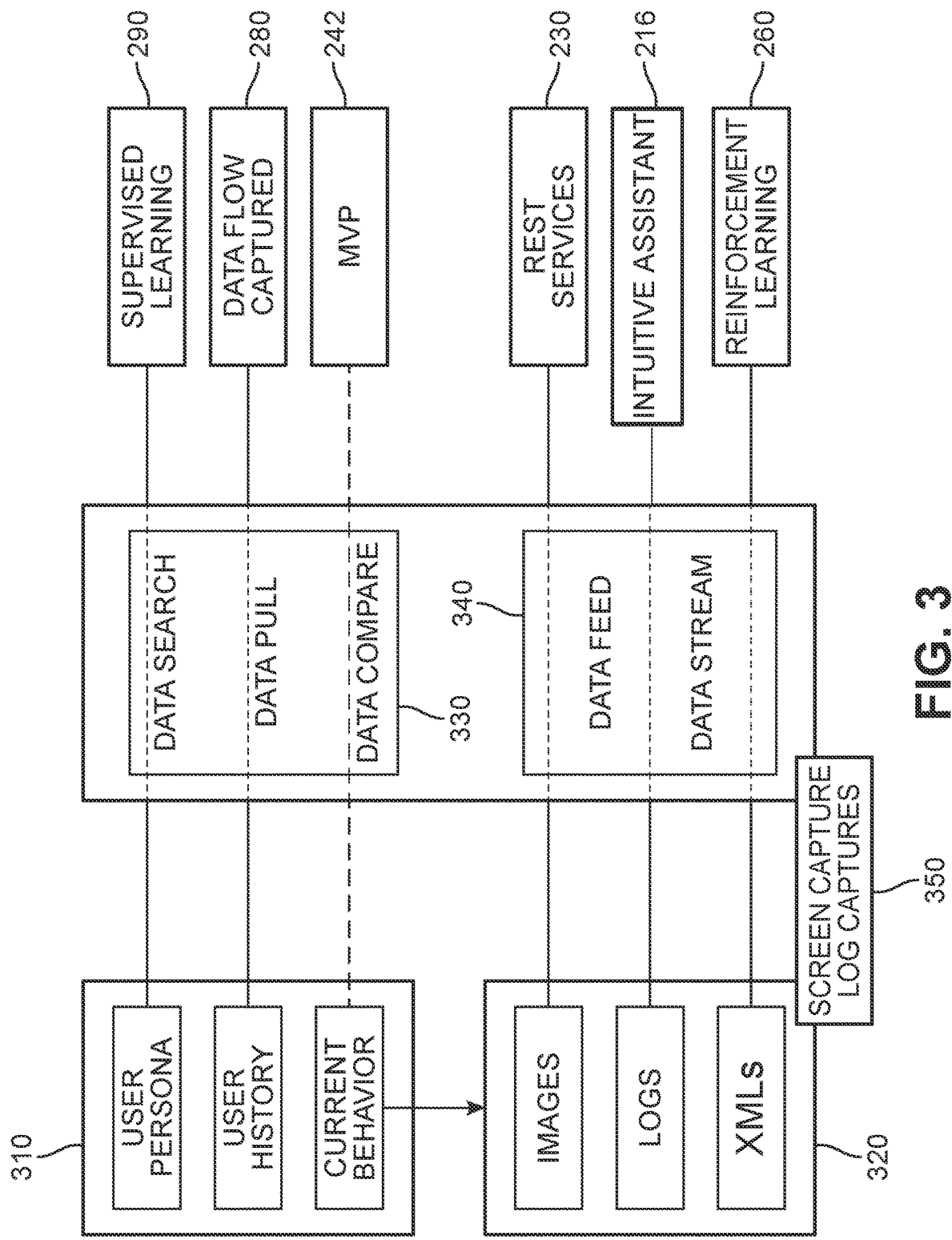

Referring now to FIGS. 2 and 3, an embodiment of an architecture 200 for an intelligent assistance service is presented. The two drawings have been separated for purposes of clarity. In different embodiments, the architecture 200 can be understood to involve four primary components: (1) empirical supervised learning 290; (2) computer vision 270 with weighted phase comparisons; (3) gated training data sets (see FIGS. 5A and 5B); and (4) behavior-based/reinforcement learning 260 (e.g., CNN or other neural networks). As a general matter, the flow of data across architecture 200 can be understood to be two-directional in that as data is collected from user devices and provided to the system, predictive responses will be generated and sent back to the user devices.

In one embodiment, as shown in FIG. 3, the system will search for and pull characteristics 310 (user persona, user history, current behavior) from each user as part of the process of supervised learning 290 during a first stage 330. User history can be captured as dataflow 280 for use as training data by each model. In addition, current behavior can more specifically be shared with a model view presenter (MVP) 262 as data from one or more source systems. As noted earlier, these characteristics 310 can take the form of digital data 320 such as images, logs, XMLs, etc., which provide a data feed and stream that is provided to the service in a second stage 340. For example, images may be sent to REST services 230, logs to an intuitive assistant module 216, and XMLs to the module for reinforcement learning 260.

Thus, in different embodiments, the data may include online data, offline data, historical data, and/or the like, that have been identified as being associated with the input and output model. In some embodiments, depending on the type of model, the data can be either structured data (e.g., from traditional business systems), human sourced data from social networks, machine generated data (e.g., data from instrumentation, sensor data, operational data, and/or the like), dark data (e.g., scanned unstructured data, such as hand written notes), and/or the like. For example, if the model is to provide guidance regarding a sequence that includes an email step, some of the data may be a corpus of emails that includes sent emails and received emails. In another example, if the model is to provide guidance regarding a sequence that includes an online form and/or some media content usage, the data may be a corpus of images and/or videos that includes image objects associated with one or more steps needed to perform the task.

Returning to FIG. 2, the architecture can in some embodiments be understood to comprise three sections, indicated by dotted lines. In the first section, a user interaction zone is provided, where user activity data is monitored and collected, and responses or chatbot conversations occur. The second section includes components configured to receive the data and store the data in a knowledge repository. The third section includes deep learning and other machine learning models configured to be trained using the stored knowledge and determining or predicting what tasks are being performed and what sequences are to be presented for each task.

In different embodiments, the intuitive assistant module 216 will process the received data via natural language processing (NLP) techniques, 208, filtering 206, and text analytics 204, which can be maintained at least in part in a cloud network 202. The processed data is then shared with the system. As shown in FIG. 2, a remote procedure (RPC) 240 call such as, but not limited to, XML RPC can be used to exchange data between a wide variety of devices on the network. In other embodiments, other RPC protocols may be used that enable the service to request a service from a program located in another computer on a network. The data is then provided to MVP 262 as a collective repository of dataflow 280. In some embodiments, a NoSQL database 250 provides a mechanism for storage and retrieval of the captured data for comparison and learning. The data can be stored, used to guide the user, and used as a basis for comparison (see module 252) by a reinforcement learning module 260, which can determine the optimal path for each task. In some embodiments, the data is also compared using computer vision 270 and NLP techniques before submission to the reinforcement learning module 260. In some embodiments, the dataflow is prepared using a markup language used for structuring and presenting content such as but not limited to HTML 5 and/or languages used for describing the presentation of a document written in a markup language such as but not limited to CSS 3. Finally, the predicted path can be presented to a user 210 via a guided screen interface 214 and/or an interactive chatbot 212.

Figure 4:
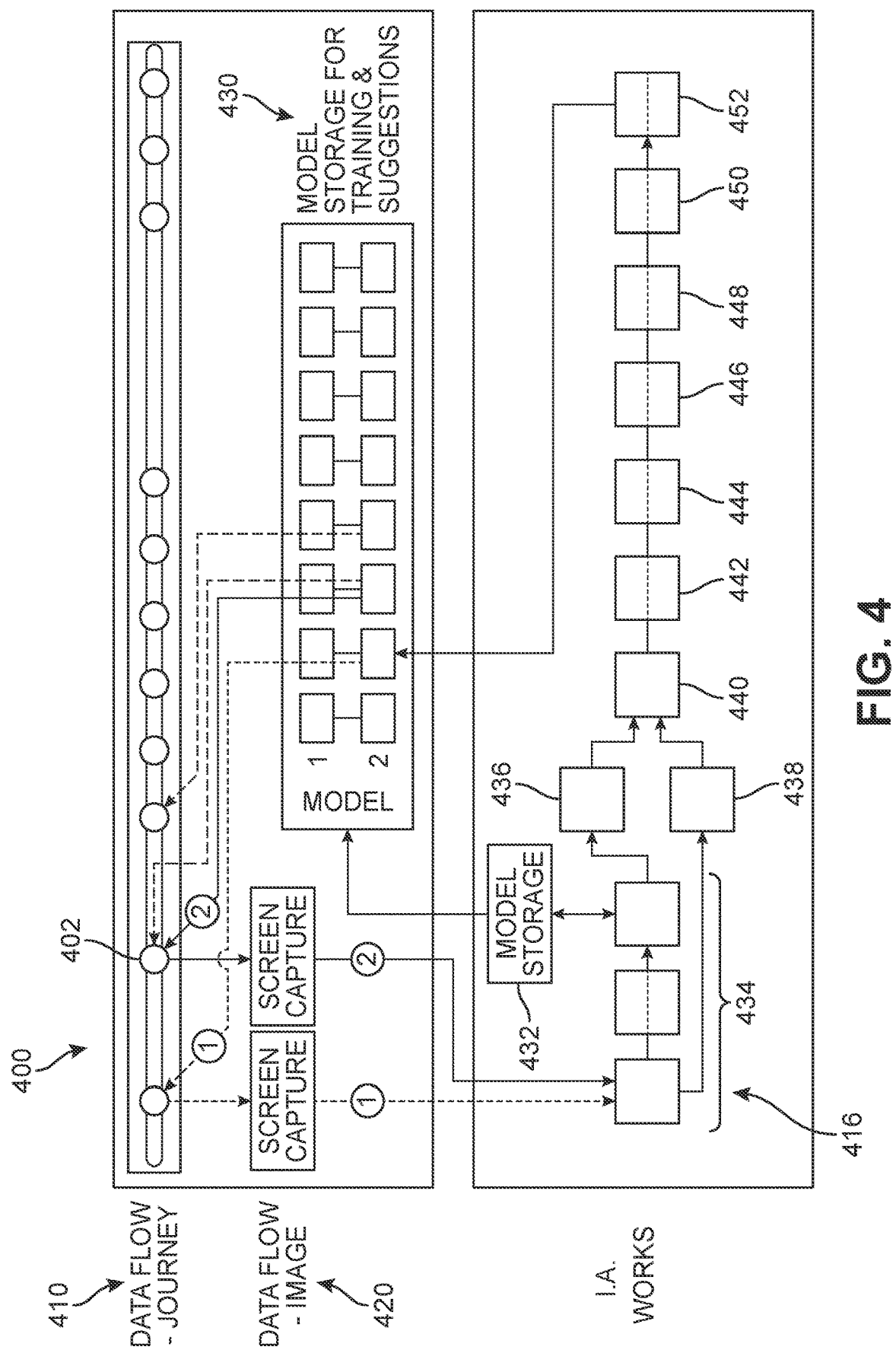
FIG. 4 is a schematic flow diagram representing a data flow journey analysis, according to an embodiment.

In order to better illustrate the dataflow associated with the assistant module, a journey analysis diagram 400 is shown in FIG. 4. In a typical data flow journey 410, there may be multiple steps 402 that are performed in order to accomplish a specific task. Along each of these steps 402, a different part or 'sub-task' of the larger task will occur. For example, in cases where a user is an employee at a mobile internet device retail store, one possible task that might be required is the ordering of a new mobile device with a data plan for a customer. The employee may log into their company's service platform and start to fill in a first page in which customer information is entered into the system. Once the employee submits this, they may move to a procurement request form for selecting the device. This form may be specific to the type of device (e.g., computer, tablet, phone, etc.) that is being requested by the customer. Thus, the employee must ensure that the correct form is selected. This pattern may continue until the information is complete and submitted to the back-end system for fulfillment.

As discussed with respect to FIGS. 2 and 3, in different embodiments, the intuitive assistant service disclosed herein can collect user data in order to identify the process or task that is being performed by the end-user. In FIG. 4, an example of the data collection is depicted in a data flow image first stage 420 where the system automatically initiates screen captures at each step of the data flow journey 410. For example, a first screen capture 412 occurs for the first step and a second screen capture 414 occurs for the second step. It can be appreciated that in different embodiments, the system is configured to allow for the restriction of screen shots to those images that are likely to be relevant, thereby preventing the capture of a user's personal information or computer habits. These image data will be provided to the intuitive assistant module, where further processing will occur in a second stage 434 in order to determine what information was being accessed and/or entered by the user during the respective step based at least on the screen capture. There will be a validation process in a third stage 438 using computer vision, as well as a comparison of the extracted text to the image (fourth stage 436). In some embodiments, the processed data will be stored in model storage 432.

As a general matter, validation can occur via a validation module configured to receive a model and data for the model from a variety of sources. In some embodiments, the sources may include a client device, a server device, a data structure, and/or the like. In some embodiments, a model may include a set of parameters learned from data, which enable creating outcomes on new data observations. Furthermore, although the singular term "model" is used herein, the model may include one or more models. In different embodiments, the model may include an artificial intelligence model (e.g., a multiple regression analysis model, an artificial neural networks (ANNs) model, a case-based reasoning (CBR) model, and/or the like), a machine learning model (e.g., a supervised learning model, an unsupervised learning model, a linear regression model, a logistic regression model, a naïve Bayes model, and/or the like), a deep learning model (e.g., a recurrent neural network (RNN) model, a convolution deep neural network (CNN) model, and/or the like), and/or the like.

Furthermore, in some embodiments, the validation module may pre-process the data by determining correlations, general trends, outliers, and/or the like associated with the data, and by performing an analysis of the data based on histograms, scatter plots, box plots, and/or the like determined based on the correlations, general trends, outliers, and/or the like associated with the data. In such cases, the validation module may further pre-process the data by cleaning the data based on inconsistent values, duplicate records, invalid entries, and/or the like, by merging duplicate records based on industry-specific domain knowledge, and by transforming and scaling the data using data manipulation and feature detection.

Returning to FIG. 4, in different embodiments, the position of the each of the pixels comprising validated screen capture data 440 are identified in a fifth stage 442, and then provided to the machine learning—neural network module in a sixth stage 444. In some cases, based on the output of the machine learning algorithm, the system will access the database to initiate a search as to which model most likely matches the user's current behavior in a seventh stage 446. Using weighted scoring, the model will be identified in an eighth stage 448. This model is then shared to a visualization layer such as but not limited to a D3.JS layer in a ninth stage 450, which is used to produce a visual guide to the user in a tenth stage 452. The output of first through tenth stage is also sent to the model for training and suggestions in an eleventh stage 430. It can be seen that the model will also be used to generate and display additional guidance at further steps 402 along the data flow journey 410. For example, in some embodiments, the guidance will present help for the current step, as well as an indication of what the next step should be. In some other embodiments, a larger portion—or entirety—of the sequence of steps or data journey for performing the specific task can be summarized and/or graphically represented in order to offer a broad reference to the user as they navigate from one step to the next. In another example, the guidance can alert the user if they are selecting a step that is 'out of sequence' or otherwise inappropriate for their selected task.

Figure 5A:
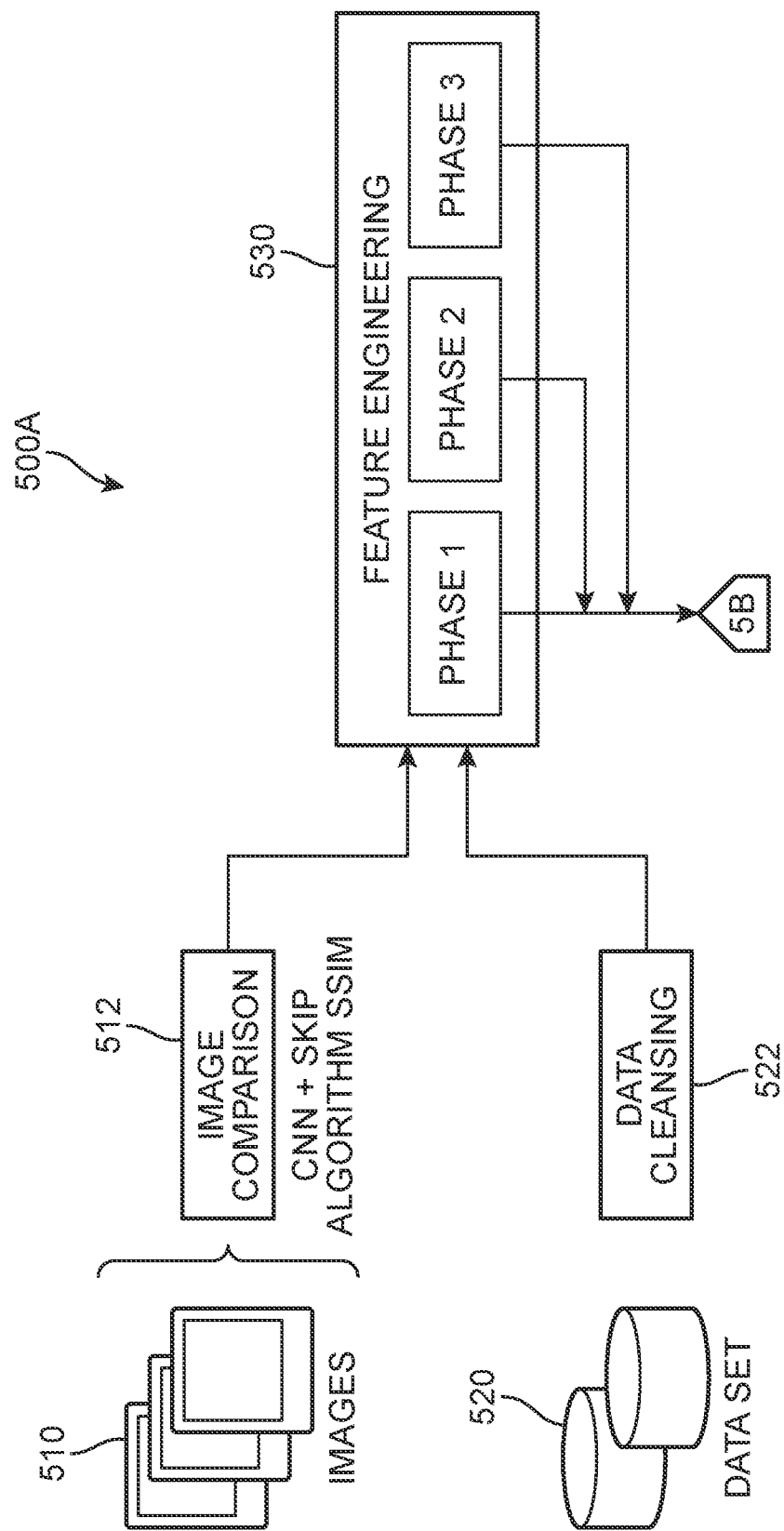
FIGS. 5A and 5B are schematic flow diagrams of a supervised learning process for training models for use by the predictive assistance service, according to an embodiment.
Figure 5B:
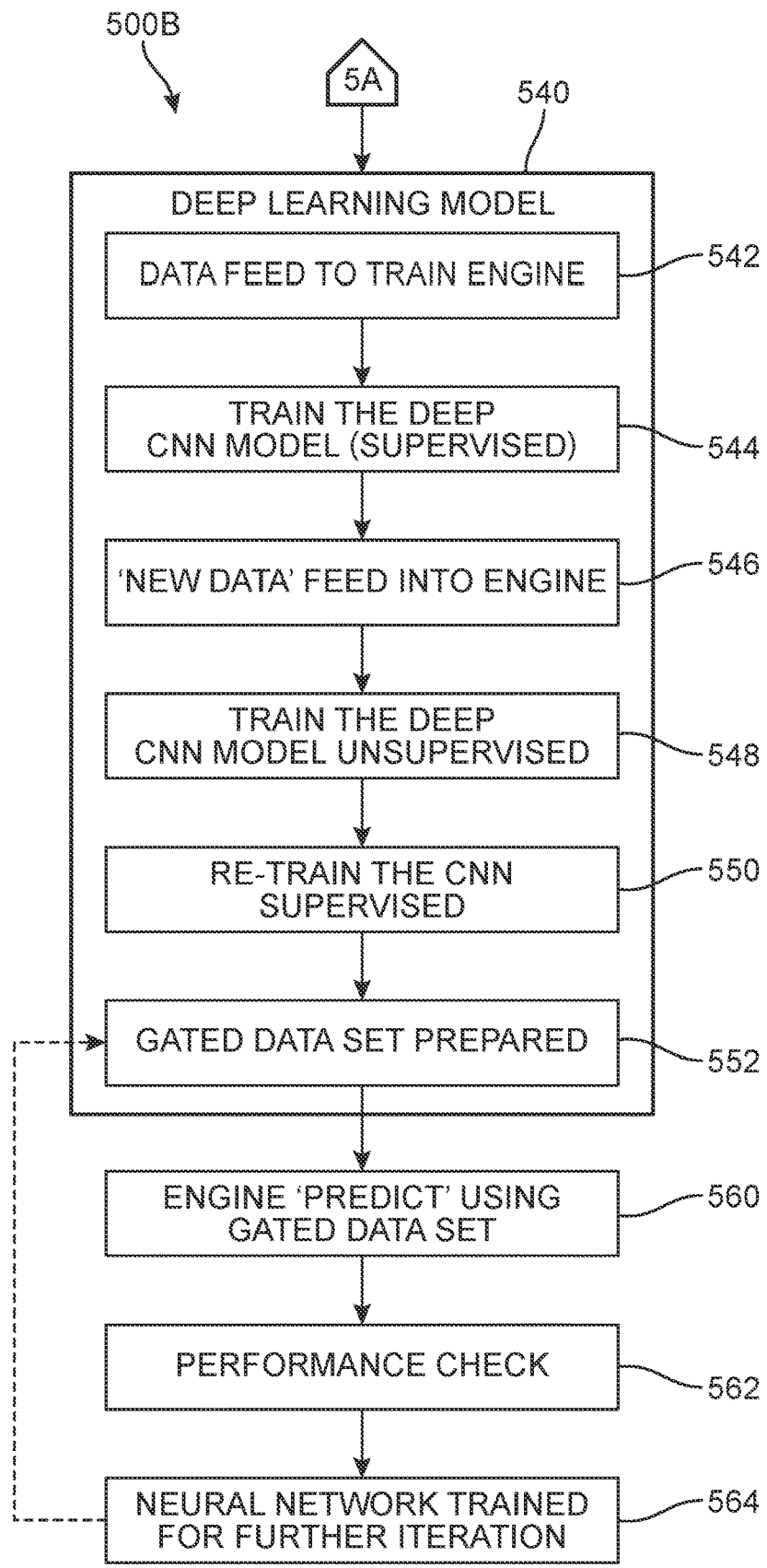

FIGS. 5A and 5B together present a flow diagram (500a, 500b) illustrating an embodiment of empirical supervised learning for training the models as described herein. As noted earlier, each model will be trained to offer high predictive accuracy in determining what a user's next step should be based on their current behavior. In some embodiments, the empirical supervised learning process uses gated CNN to develop the accuracy needed. In FIG. 5A, the source data, in this example shown as image data 510, and data sets 520 comprising training, validation, and other data sets, are cleansed by a data cleansing module 522.

As a general matter, a data set is a set of multiple data objects, and a training set is a data set of data objects used for inferring a function for classification (i.e., a classifier). For example, the training data can include a repository of labeled activity patterns for the software over the course of several months or years. The training sets may thus include supervised training sets that include labeled or tagged data objects, which are used by one or more machine learning functions to generate the classifiers. Each of the labels for the data objects can indicate whether the respective data object is classified under a particular category (e.g., persona, current behavior, historical user data, product category and product details or other task labels), what task(s) the data should be linked to, the expertise of the user from whom the data was collected, and/or where in a sequence a particular step should be positioned (e.g., before Step A but after Step B for the Task Y while it should be before Step A and Step B but after Step C for the Task Z). Labels may be manually generated, may be specified in historic data, or may be generated automatically. Some training algorithms may include Generalized Linear Models (LM), K-nearest neighbors (KNN), Support Vector Machines (SVM), Forests of randomized trees (RT), Convolutional Neural Network (CNN). In one example, a generalized method is used to combine the predictions of the basic estimators including the LM, KNN, SVM, RT, and CNN to achieve higher classification accuracy, better generalizability and robustness in the system. In addition, a validation set is used to validate the classifier generated from the training set. For example, the validation set includes data objects pre-determined to be in particular categories, and the trained classifier classifies the data objects in the validation set to determine whether the classifier correctly classifies the data objects into their particular categories.

These data are further processed by an image comparison module 512 (see FIG. 7) that is configured to review each screen capture and determine whether there is a corresponding match for the image in the data sets 520. In some embodiments, the image comparison module 512 can apply CNN, SKIP algorithms, and/or SSIM (structural similarity) to perform the comparison, or other techniques that can offer high image resolution and/or enhancement.

In different embodiments, the data cleansing techniques may include techniques that detect and correct (or remove) corrupt or inaccurate records from the data, and that identify incomplete, incorrect, inaccurate, or irrelevant portions of the data and replace, modify, or delete the identified portions of the data. In some embodiments, the data reduction techniques may include techniques that transform numerical or alphabetical digital information (e.g., the data) into a corrected, ordered, and simplified form, and/or that reduce a quantity of the data to meaningful parts. In some cases, the data transformation techniques may include techniques that convert the data from one format or structure into another format or structure. The data transformation may be simple or complex based on required changes to the data between source (initial) data and target (final) data.

In different embodiments, the data cleansing module 522 can also include one or more other pre-processing techniques to pre-process the data, such as data reduction techniques, data transformation techniques, and/or the like. In some cases, the module may select the one or more pre-processing techniques based on a variety of factors, such as a type associated with the data (e.g., video data, image data, text data, and/or the like), whether a source of the data provides voluminous data that needs to be cleaned and/or reduced in size, whether the data is provided in a format that requires conversion to a particular format that may be utilized by the validation platform, and/or the like.

The processed data is then subjected to one or more feature engineering techniques via a feature reduction module 530. As a non-limiting example, this process may be described in phases. For example, in a first phase, platforms such as Microsoft® Azure, SCIKIT, and/or technologies such as Python, deep learning and web-based scripts can be employed to build the various elements of the assistance service system.

In a second phase, data mining and/or data transformation of the data objects received occurs in order to generate the training sets to develop classifiers with greater accuracy. These techniques can employ one or more of regression, K-means, variance, Gaussian distribution, and/or unwanted features techniques. In some embodiments, K-NN and other machine learning algorithms such as classifiers including deep learning classifiers, reinforcement learning, semi-supervised learning, cluster analysis, hierarchical clustering, association rule learning, artificial neural network, unsupervised learning, linear classifier, decision tree, Bayesian analysis, and the like may be used. Some other examples of such machine learning classifiers that may be used includes CNN, RNN including Long Short Term Memory or a combination of the classifiers. In other examples, K-means machine learning may be used to cluster or group the features of the data.

In a third phase, additional feature engineering techniques may be performed to determine features for analysis during model building. As a general matter, in machine learning and statistics, feature selection, also known as variable selection, is the process of selecting a subset of relevant features (variables, predictors) for use in model construction. Feature extraction is for creating a new, smaller set of features that still captures most of the useful information. Dimension reduction or feature reduction may be used to reduce an initial d-dimensional feature space to a k-dimensional feature subspace (where k<d). Some non-limiting examples of methods for dimension reduction or feature reduction that may be employed include: principal component analysis (PCA), linear discriminant analysis (LDA), elbow method, single value decomposition, regularization, data compression, regularization, ensembling, early stopping, and other such techniques. It is understood that, in some embodiments, other methods of feature engineering may be employed for model building.

The output of the feature reduction module 530 is then provided to a deep learning model 540, represented schematically in FIG. 5B. The deep learning model 540 is configured to prepare a gated data set that enables the system to train each model (guided task sequence) using only the data that is applicable for that specific task and region or other such parameters that can affect how and when a particular model should be implemented. As shown in FIG. 5B, in a first step 542, the data is fed into the deep learning model in order to train the prediction engine. In a second step 544, the engine is trained using supervised deep learning techniques (e.g., CNN). In a third step 546, new data such as image data in FIG. 5A, is also fed into the prediction engine, and the engine is trained, this time using unsupervised deep learning techniques (e.g., CNN) in a fourth step 548. At a fifth step 550, the prediction engine is re-trained using supervised deep learning techniques, and the gated data set is prepared in a sixth step 552. In some embodiments, the image data 510 can be distributed into multiple categories depending on how the data is being defined (e.g., persona, current behavior, historical use) using various gating mechanisms such as LSTM, GRU, RNN, etc. The preparation of gated data sets also ensures that overfitting is greatly reduced, while improving efficiency and reducing the number of computational resources needed to perform the service. Thus, the use of gating at this stage substantially narrows the amount of information that is needed to generate a prediction, reducing both analysis and processing time and resources.

In different embodiments, the prediction engine can be equipped to predict the model that should be applied once the gated data set is prepared, as in a seventh step 560. In some embodiments, the prediction engine's performance can be assessed in an eighth step 562, and training of the neural network can continue in further iterations as new data is obtained in a ninth step 564 to continue applying gating mechanisms to the data.

Figure 6:
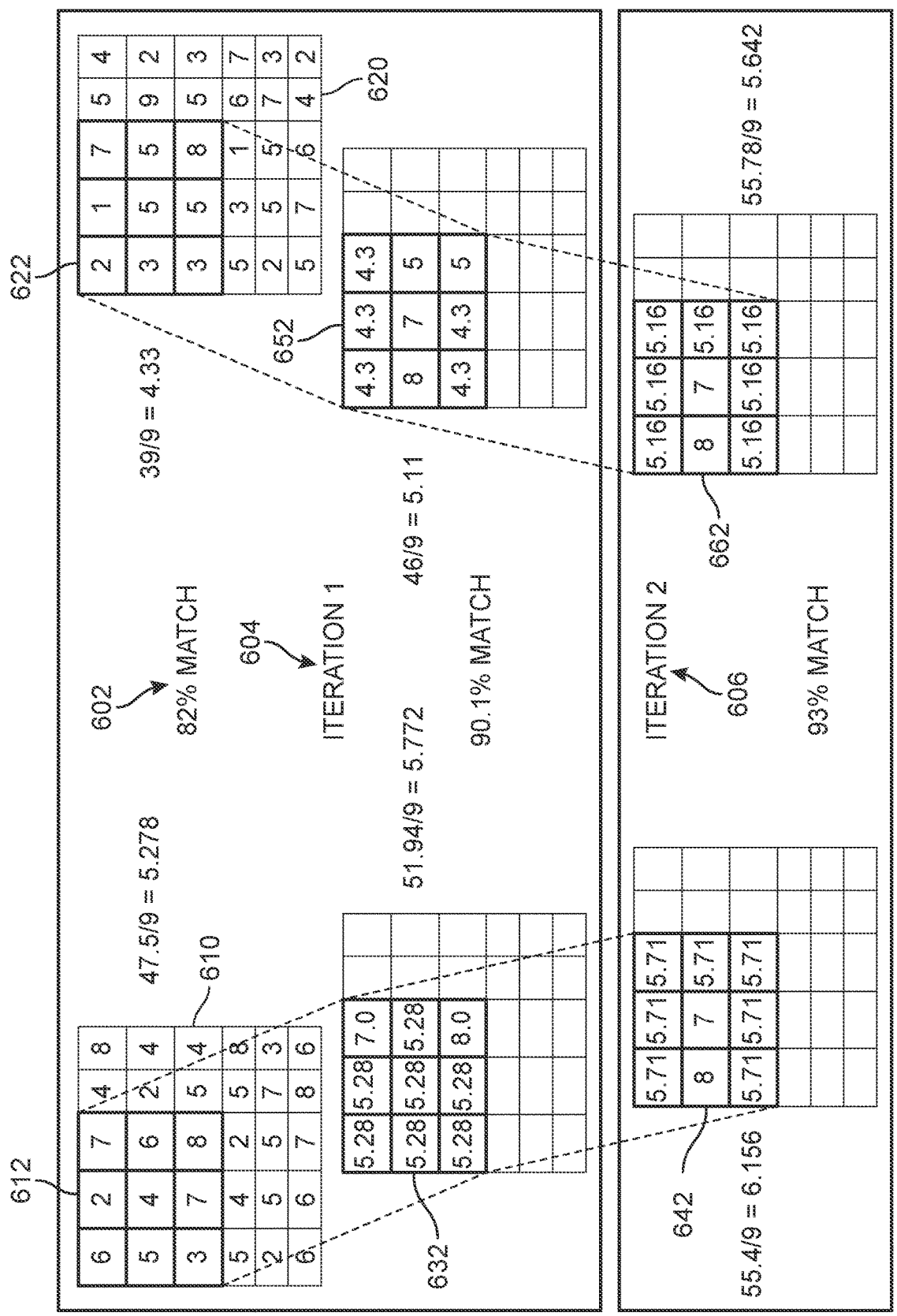
FIG. 6 is a schematic diagram of an example of a gating mechanism as applied to pixels of an image, according to an embodiment.

One example of a process of gating with respect to pixels in image data is presented in FIG. 6. For purposes of this illustration, each grid of numbers comprising first grid 610 and second grid 620 should be understood to refer to a pixel unit that may be part of an image (such as a screen capture). A pixel unit may comprise a single pixel or a small set of neighboring pixels. Thus, first grid 610 is a representation of a first pixel unit taken from a first image, and second grid 620 is a representation of a second pixel unit taken from a second image. As noted above, the system is configured to compare images and determine when two images have a high likelihood of representing the same step in a sequence.

It may be appreciated that for a particular set of images relating to similar tasks (e.g., emails, word documents, webpage, etc.) a large portion of each image will match. However, many of these quasi-matches should not be classified as matches for use by the prediction engine. In order to ensure that the designation of a match between two images is more accurate, a process of determining weights for each pixel unit may be implemented that can more reliably and correctly predict whether two images should be classified as a match.

In an initial comparison stage 602, for purposes of this example, a first matrix 612 of the first grid 610 (from the first image) is highlighted, and a second matrix 622 positioned in the same location in second grid 620 (from the second image) is also highlighted. At this stage, the two matrices have been calculated as having a match score of approximately 82%, which for purposes of this illustration is too low to establish a match. The two matrices are then adjusted in a first iteration 604 by assigning a sigma score to each—for example, for first matrix 612 the sigma score is 5.2 (i.e., 6+2+7+5+4+6+3+7+8=47.5/9=5.278), and for the second matrix 622, the sigma score is 4.33 (i.e., 1/9 (2+1+ 7+3+5+5+3+5+8)=39/9=4.33). The sigma scores can be used to correct or otherwise retabulate the values of each matrix, as shown with a first corrected matrix 632 (for first matrix 612) and a second corrected matrix 652 (for second matrix 622). When comparing the two corrected matrices, there is now a match score of approximately 90.1%, which indicates there is a higher likelihood that the two are indeed a match. Sigma scores are again calculated for the two matrices (shown as 5.772 and 5.11 respectively). In a second iteration 606, the first corrected matrix 632 is adjusted to provide a first final matrix 642, and the second corrected matrix 652 is adjusted to provide a second final matrix 662, which now correspond to a 93.2% match (based on sigma scores of 6.156 and 5.642). In different embodiments, the prediction engine may require a match score of greater than 80-90% to confirm the match. In one embodiment, the match score must be greater than 85-88%. This process can ensure that the chance of an erroneous result is minimized.

Furthermore, in different embodiments, weighted phase comparisons may be used in order to increase accuracy of the predictive dataflow. As one non-limiting example, in different embodiments, the proposed learning techniques are configured to train the prediction engine by performing feature identification to identify a set of features (e.g., variables corresponding to data entries in the training data set) that are predictive, and feature reduction to reduce the identified set of features to a subset with a greatest predictive power, as shown in FIG. 5A. Performing feature reduction may reduce a processing resource utilization associated with training and/or using the model. In some embodiments, the deep learning model may assign weights to the subset of features to enable prediction of a model of a subsequent test case. For example, the deep learning model may iteratively apply weights, as shown in FIG. 6, determine a predictive power of a model using the validation set, and selectively adjust the weights based on the predictive power, as discussed below. In one example, the deep learning model may identify one or more portions of the text and/or images that are predictive of a section of a sequence in which the text and/or images are used.

It may be appreciated that each model prediction will depend on the specific journey (data flow) that is selected, as well as the context (e.g., behavior and persona) of the user. Thus, the prediction engine must undertake a complex decision-making process and evaluate user behavior patterns by analyzing images and the specific sequence of images in order to predict the next step. In some embodiments, accuracy can improve by the use of computer vision-based image comparisons. In such cases, image data may be converted to grayscale. Because each image comprises an array of pixels, each pixel has an immutable phase difference. While patterns of user behavior are usually categorical, phase differences of pixels from one image to another makes it possible to incorporate such comparative data.

More specifically, behavior patterns can be defined with reference to image identifications (comparison and maps with a model, as discussed above). Based on previous user interactions that altered the screen image and their current image position, a user's next selection or desired move can be predicted. The image comparison is improved when a two-dimensional array is created that includes phase information for each pixel relative to its next neighboring pixels. Multiple iterations for each neighboring pixel with phase information are performed and pixels are paired and weightages applied. This technique will be repeated until the entire image is defined as such and stored as part of a model for deep learning.

Thus, when images are captured from a user's computing device, converted to gray scale, a phase comparison algorithm will be used to compare the array to accurately identify the image and identify the step of the user's journey that is represented by that image. Based on that determination, along with the techniques described earlier, the system will guide the user to the next step of the process.

Figure 7:
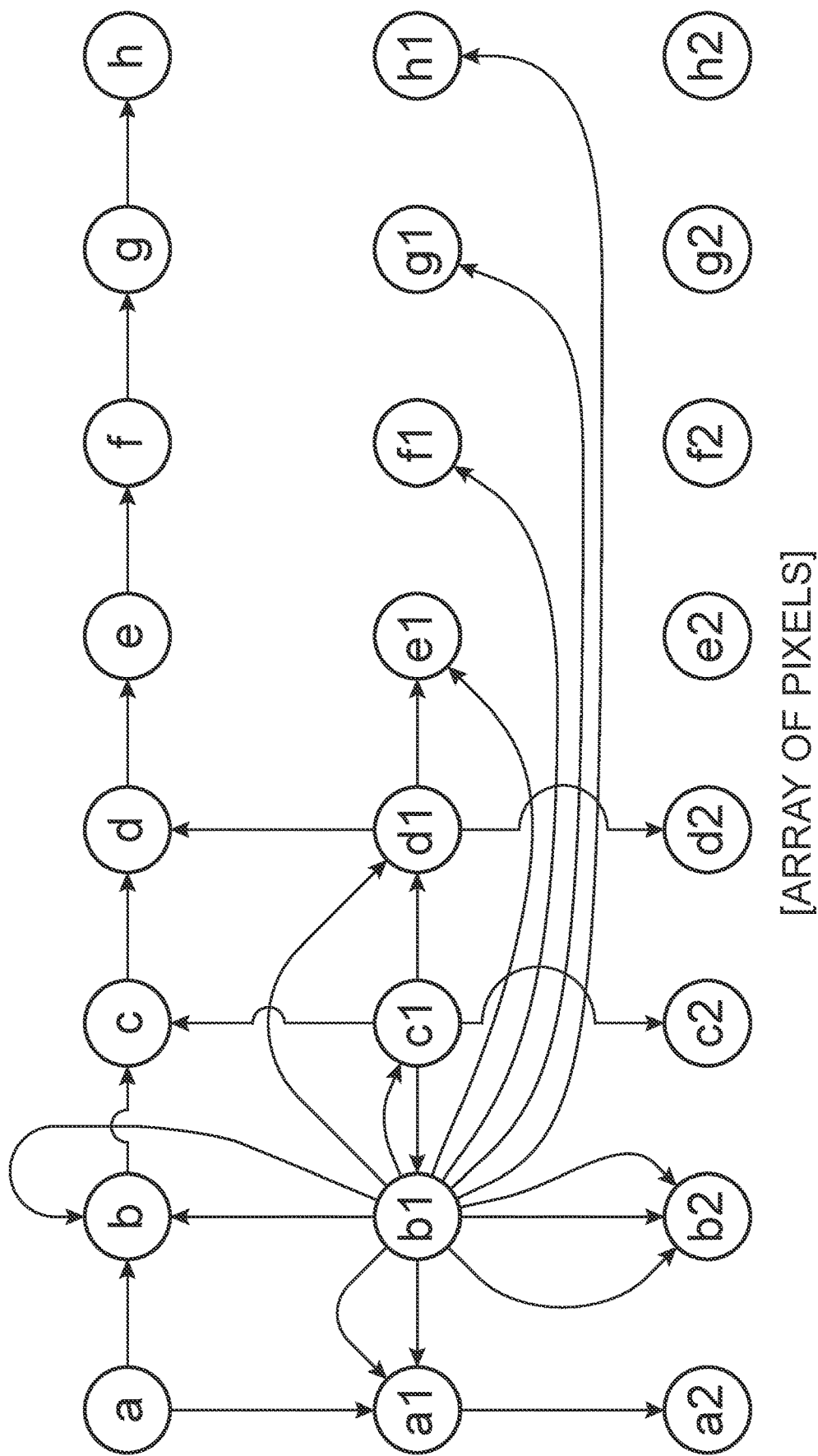
FIG. 7 is an example of an application of a phase difference algorithm in comparing pixel sets, according to an embodiment.

One example of this process is illustrated in FIG. 7, where a sample array 700 is depicted. It may be understood that phases are derived from each pixel's position. Referring to the sample array 700, an example pixel "b1" is shown for which a phase comparison will be performed. In a first iteration, a phase difference between b1→a1, b1→b, b1→c1, and b1→b2 is derived. In a second iteration, a phase difference between b1→c1→d1 (combined weighted phase) is derived. In a third iteration, a phase difference between b1→c1→d1→e1 (combined weighted phase) is derived. In a fourth iteration, a phase difference between b1→c1→d1→e1→f1 (combined weighted phase) is derived. In a fifth iteration, a phase difference between b1→c1→d1→e1→f1→g1 (combined weighted phase) is derived. In a sixth iteration (and so forth) a phase difference between b1→c1→d1→e1→f1→g1→h1 (combined weighted phase) is derived. The phase differences between the pixels are used to compare the target image with the comparison image to obtain a more accurate predative data flow.

Thus, the proposed assistance service system may use a set of image processing techniques, such as an image matching technique, to compare pixels. The system may train the first set of data models using the first set of weighted training features. For example, the system may use the first set of weighted training features to train multiple data models, such as by training decision trees, predictive models, neural networks, and/or the like. By training multiple data models, the system is able to select an optimal data model to use, from the multiple data models, thereby conserving resources by reducing sparsity and overfitting relative to using a less optimal data model, as described further herein.

Figure 8:
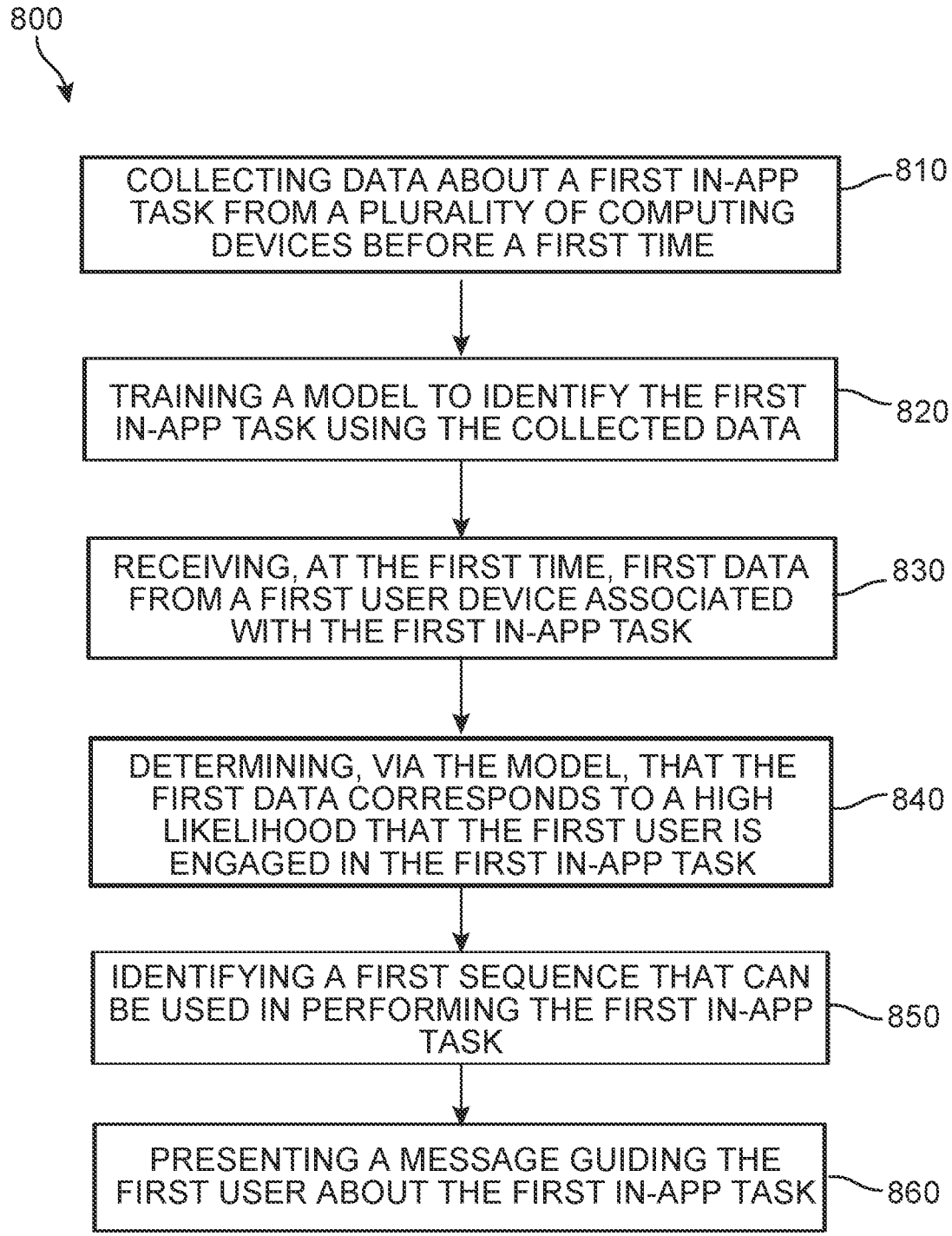
FIG. 8 is a flow chart depicting a method of offering predictive and automated guidance to a user of software, according to an embodiment.

FIG. 8 is a flow chart illustrating an embodiment of a computer implemented method 800 of offering predictive and automated guidance to a user of software. The method 800 includes a first step 810 of automatically collecting user activity data related to performing a first in-app task from a plurality of computing devices, where each computing device of the plurality is running the software over a period of time that occurs prior to a first time. A second step 820 includes training a deep learning model configured to identify the first in-app task using the collected user activity data, and a third step 830 includes receiving, from a first user computing device, first data representing in-app behavior for a first user at a first time. In addition, the method 800 includes a fourth step 840 of determining, via the deep learning model, that the first data corresponds to a high likelihood of the first user engaging in a first step of the first in-app task, and a fifth step 850 of automatically identifying, via the deep learning model, a first sequence of in-app steps that can be used to perform the first in-app task based on the collected user activity data. Furthermore, the method 800 includes a sixth step 860 of presenting, via the first user computing device, a first assistance message providing guidance about the first in-app task including information about a second step that is directly subsequent to the first step in the sequence.

In other embodiments, the method may include additional steps or aspects. For example, the collected user activity data may include a record of steps performed by one or more users of the software while engaged in the first in-app task. In another example, the method includes a step of storing the collected first user activity data in an electronic repository. In some embodiments, the first data includes at least a first image. In such cases, the method can further include steps of comparing the first image with a second image (usually generally similar or associated with similar metadata or other indications that the second image might be like the first image) stored in the electronic repository, and determining the first image is sufficiently similar to the second image so as to classify the two images as a match. In addition, in some embodiments, determining the first image and the second image are a match is based on a phase difference algorithm that compares the phase difference for pixels comprising the first image and pixels comprising the second image. In some embodiments, the method also includes a step of determining, based on the first data, that the first user is associated with a first persona type that indicate the first user's access level for the software. In such cases, the deep learning model can base its determination in part on the determined persona type. In one example, the method also includes automatically processing the collected user activity data using feature engineering techniques including feature reduction.

In one embodiment, the first image is a screen capture from the first user computing device during the first time, and the second image is a screen capture, captured before the first time, from one computing device of the plurality of computing devices. In different embodiments, the method may further include steps of determining a third step subsequent to the second step is currently unavailable, and presenting a second assistance message indicating the third step is unavailable. In another embodiment, the method can include steps of determining a third step subsequent to the second step is currently unavailable or associated with an error, and presenting a second assistance message offering guidance about a fourth step that serves as an alternate to the third step in completing the first in-app task. In another example, the method may include steps of automatically collecting second user activity data related to performing the first in-app task from one or more devices running the software over a period of time that occurs subsequent to the first time, re-training the deep learning model configured to identify the first in-app task using both the collected first user activity data and the second user activity data, and determining, based on the re-trained deep learning model, that the first data now corresponds to a high likelihood of the first user engaging in a first step of a second in-app task via the software. In some cases, the determination that the first user is associated with a first persona type is used by the deep learning model to determine that only activity data from other users associated with the first persona type should be applied during the determination or prediction of the in-app task being performed by the first user.

As described herein, the proposed embodiments enable user engagement with platforms with reduced SME dependency, while offering end-to-end guidance through the selected journey and machine-learning based validation. Furthermore, the proposed embodiments offer a high accuracy prediction engine using neural networks and phase comparison algorithms. The prediction engine is trained with images and their phases are stored in an array. Multiple iterations are performed for learning and comparing images, and this information is fed into the deep learning model. This approach can reduce noise, compensate for low sampling data during training, accommodate the presence of corrupt images (by conversion to grayscale) and algorithm errors (by use of phase comparisons with neural networks).

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment 222, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition to the algorithms and techniques described above, one or more of the following techniques may be utilized by one or more of the disclosed embodiments: RPA, Mongo DB, AI Modules such as Python, Image to Text, OCR, Computer Vision, Image comparison (phase comparison), Image Validation (image to text, then text to text comparison), Learning Algorithms, Similarity Analytics, Sequencing algorithms, Random Forest, gCNN, Data Clustering with weighted data, Data Visualization, Rocket Chat, and D3JS.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources will generally be managed by a server and data storage system maintained by a platform provider, as opposed to computers within the actual client (tenant) businesses themselves. In addition, a Cloud Service Provider (CSP) may include an organization that provides a cloud computing resource to a client device and/or a user of a client device. Furthermore, the term "component" refers to software applications and other system modules and features comprising or supporting the multi-tenant architecture.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of offering predictive and automated guidance to a user of software, the method comprising:

automatically initiating, via a virtual guidance system, a screen capture operation to obtain a first screenshot of activity of an experienced user of the software while the experienced user performs a first step of a first in-app task, the first screenshot including a first plurality of pixel units;

updating an electronic repository with user activity data for multiple experienced users of the software across a plurality of computing devices, the user activity data comprising screenshots, including the first screenshot, that were collected while each experienced user performed the first in-app task;

training a deep learning model to identify the first in-app task using the collected user activity data;

receiving, from a first user device, first data representing in-app behavior of a first inexperienced user of the software wherein the first data includes at least a second screenshot, and the second screenshot includes a second plurality of pixel units;

converting each of the first screenshot and the second screenshot to grayscale;

after converting each of the first screenshot and the second screenshot to grayscale, determining, using a pixel-by-pixel phase difference comparison algorithm, the first plurality of pixel units is sufficiently similar to the second plurality of pixel units so as to classify the first screenshot and the second screenshot as a match;

predicting, via the deep learning model and based on the match, that the first inexperienced user is performing the first step of the first in-app task;

automatically identifying, via the deep learning model and based on the user activity data, a sequence of in-app steps that can be used by the first inexperienced user to complete the first in-app task with greater proficiency; and generating, via the virtual guidance system for presentation by the first user device, a step-by-step graphical model that guides the first inexperienced user through each step of the identified sequence of in-app steps thereby providing guidance about the first in-app task to the first inexperienced user.

2. The method of claim 1, wherein the collected user activity data includes a record of where each user was located as the respective user engaged in the first in-app task.

3. The method of claim 1, wherein the first data further includes logs and XMLs generated by the first inexperienced user while using the software.

4. The method of claim 1, wherein the step-by-step graphical model includes an alert if a step of the sequence is associated with delays.

5. The method of claim 4, wherein the alert includes an option to be rerouted to a different step of the sequence to avoid the step associated with delays.

6. The method of claim 1, further comprising determining, based on the first data, that the first inexperienced user is associated with a first persona type that indicates the first inexperienced user's access level for the software, and the deep learning model bases its prediction in part on the first persona type.

7. The method of claim 1, further comprising automatically processing the collected user activity data using feature engineering techniques including feature reduction.

8. The method of claim 1, further comprising:
determining a second step of the sequence is currently unavailable; and
presenting a message to the first inexperienced user indicating the second step is unavailable and offering guidance about a third step that serves as an alternate to the second step in the sequence.

9. The method of claim 1, further comprising gating the first data and using the gated first data at the deep learning model when making the prediction.

10. A non-transitory computer-readable medium storing software comprising instructions executable by one or more computers which, upon such execution, cause the one or more computers to:
automatically initiate, via a virtual guidance system, a screen capture operation to obtain a first screenshot of activity of an experienced user of the software while the experienced user performs a first step of a first in-app task, the first screenshot including a first plurality of pixel units;
update an electronic repository with user activity data for multiple experienced users of the software across a plurality of computing devices, the user activity data comprising screenshots, including the first screenshot, that were collected while each experienced user performed the first in-app task;
train a deep learning model to identify the first in-app task using the collected user activity data;
receive, from a first user device, first data representing in-app behavior of a first inexperienced user of the software wherein the first data includes at least a second screenshot, and the second screenshot includes a second plurality of pixel units;
convert each of the first screenshot and the second screenshot to gray scale;
after converting each of the first screenshot and the second screenshot to gray scale, determine, using a pixel-by-pixel phase difference comparison algorithm, the first plurality of pixel units is sufficiently similar to the second plurality of pixel units so as to classify the first screenshot and the second screenshot as a match;
predict, via the deep learning model and based on the match, that the first inexperienced user is performing the first step of the first in-app task;
automatically identify, via the deep learning model and based on the user activity data, a sequence of in-app steps that can be used by the first inexperienced user to complete the first in-app task with greater proficiency; and
generate, via the virtual guidance system for presentation by the first user device, a step-by-step graphical model that guides the first inexperienced user through each step of the identified sequence of in-app steps thereby providing guidance about the first in-app task to the first inexperienced user.

11. The non-transitory computer-readable medium storing software of claim 10, wherein the first data further includes logs and XMLs generated by the first inexperienced user while using the software.

12. The non-transitory computer-readable medium storing software of claim 10, wherein the step-by-step graphical model includes an alert if a step of the sequence is associated with delays.

13. The non-transitory computer-readable medium storing software of claim 12, wherein the alert includes an option to be rerouted to a different step of the sequence to avoid the step associated with delays.

14. A system for offering predictive and automated guidance to a user of software, comprising one or more computers and one or more storage devices storing instructions, the instructions when executed by the one or more computers, cause the one or more computers to:
automatically initiate, via a virtual guidance system, a screen capture operation to obtain a first screenshot of activity of an experienced user of the software while the experienced user performs a first step of a first in-app task, the first screenshot including a first plurality of pixel units;
update an electronic repository with user activity data for multiple experienced users of the software across a plurality of computing devices, the user activity data comprising screenshots, including the first screenshot, that were collected while each experienced user performed the first in-app task;
train a deep learning model to identify the first in-app task using the collected user activity data;
receive, from a first user device, first data representing in-app behavior of a first inexperienced user of the software wherein the first data includes at least a second screenshot, and the second screenshot includes a second plurality of pixel units;
convert each of the first screenshot and the second screenshot to gray scale;
after converting each of the first screenshot and the second screenshot to gray scale, determine, using a pixel-by-pixel phase difference comparison algorithm, the first plurality of pixel units is sufficiently similar to the second plurality of pixel units so as to classify the first screenshot and the second screenshot as a match;
predict, via the deep learning model and based on the match, that the first inexperienced user is performing the first step of the first in-app task;
automatically identify, via the deep learning model and based on the user activity data, a sequence of in-app steps that can be used by the first inexperienced user to complete the first in-app task with greater proficiency; and
generate, via the virtual guidance system for presentation by the first user device, a step-by-step graphical model that guides the first inexperienced user through each step of the identified sequence of in-app steps thereby providing guidance about the first in-app task to the first inexperienced user.

15. The system of claim 14, wherein the first data further includes logs and XMLs generated by the first inexperienced user while using the software.

16. The system of claim 14, wherein the step-by-step graphical model includes an alert if any step of the sequence is associated with delays.

17. The system of claim 14, wherein the instructions further cause the one or more computers to determine, based on the first data, that the first inexperienced user is associated with a first persona type that indicates the first inexperienced user's access level for the software, and the first persona type is used by the deep learning model in order to filter the activity data to activity data collected for users of the same persona type.

* * * * *